United States Patent
Maruhashi

(10) Patent No.: US 8,576,734 B2
(45) Date of Patent: Nov. 5, 2013

(54) INFORMATION PROCESSING APPARATUS, CONTROL METHOD THEREOF AND PROGRAM

(75) Inventor: Kazuaki Maruhashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/841,404

(22) Filed: Jul. 22, 2010

(65) Prior Publication Data
US 2011/0032836 A1 Feb. 10, 2011

(30) Foreign Application Priority Data
Aug. 7, 2009 (JP) .................................. 2009-184832

(51) Int. Cl.
*G01R 31/08* (2006.01)
(52) U.S. Cl.
USPC ............ 370/252; 370/230; 370/231; 370/235
(58) Field of Classification Search
None
See application file for complete search history.

(56) References Cited

U.S. PATENT DOCUMENTS

| | | |
|---|---|---|
| 2004/0003296 A1 | 1/2004 | Robert et al. |
| 2004/0184444 A1* | 9/2004 | Aimoto et al. ................ 370/352 |
| 2009/0244087 A1* | 10/2009 | Okano .......................... 345/589 |
| 2009/0284650 A1* | 11/2009 | Yu et al. ..................... 348/390.1 |
| 2009/0285110 A1* | 11/2009 | Yamasaki ..................... 370/252 |
| 2010/0037318 A1 | 2/2010 | French et al. |
| 2010/0135315 A1* | 6/2010 | Fourcand ...................... 370/419 |
| 2011/0013516 A1* | 1/2011 | Black et al. ................... 370/236 |

FOREIGN PATENT DOCUMENTS

| | | |
|---|---|---|
| JP | 2006-133895 A | 5/2006 |
| JP | 2006-270470 A | 10/2006 |

\* cited by examiner

*Primary Examiner* — David Oveissi
(74) *Attorney, Agent, or Firm* — Fitzpatrick, Cella, Harper & Scinto

(57) ABSTRACT

The present invention provides an information processing apparatus that, during data communication with a plurality of external apparatus, maintains the accuracy of the data communication and reduces the power consumed in the data communication, and a control method thereof. To accomplish this, the information processing apparatus sets a communication rate of data communication with a plurality of communicatively connected external apparatus, and measures a receiving interval between data packets received in the data communication with the external apparatus. Furthermore, the information processing apparatus determines whether or not the measured receiving interval exceeds a predetermined threshold. If the interval exceeds the predetermined threshold, the information processing apparatus maintains the currently set communication rate. If the interval does not exceed the predetermined threshold, the information processing apparatus changes the currently set communication rate to a faster communication rate.

7 Claims, 7 Drawing Sheets

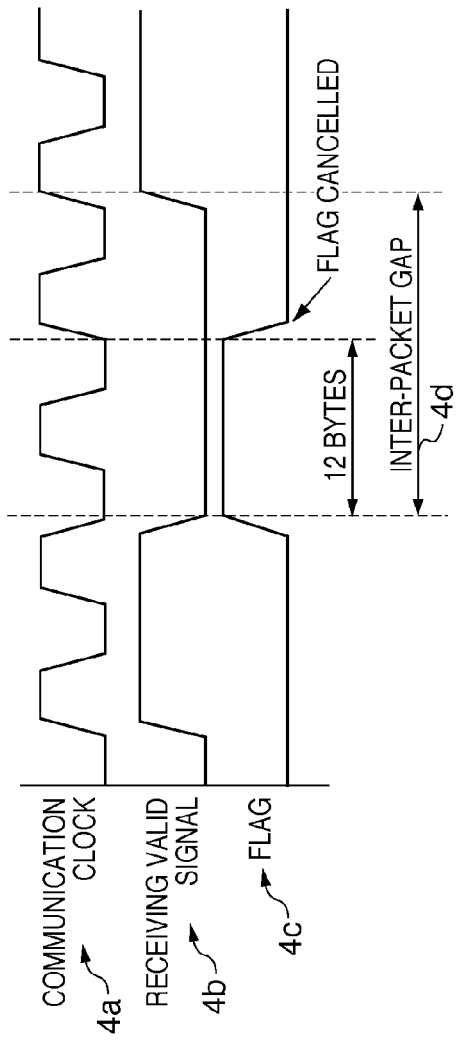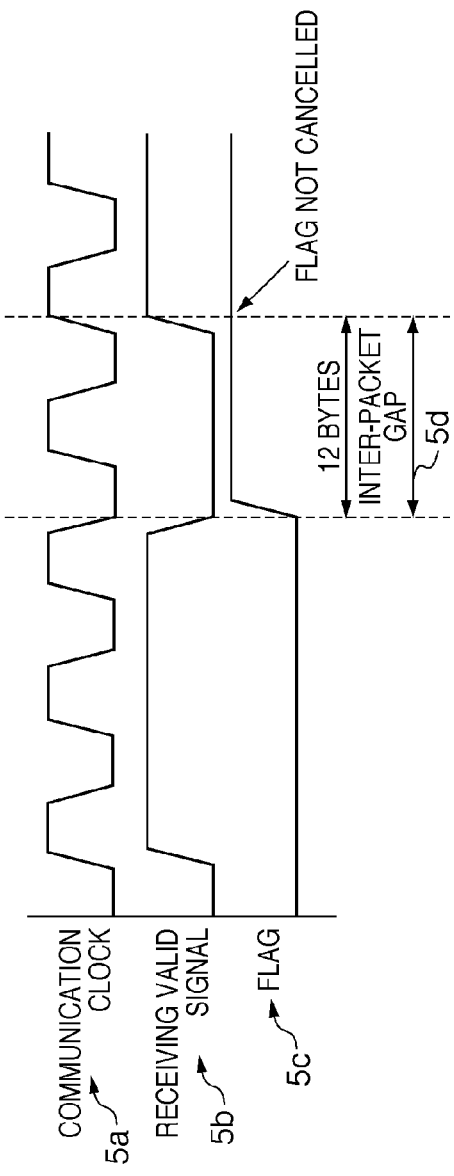

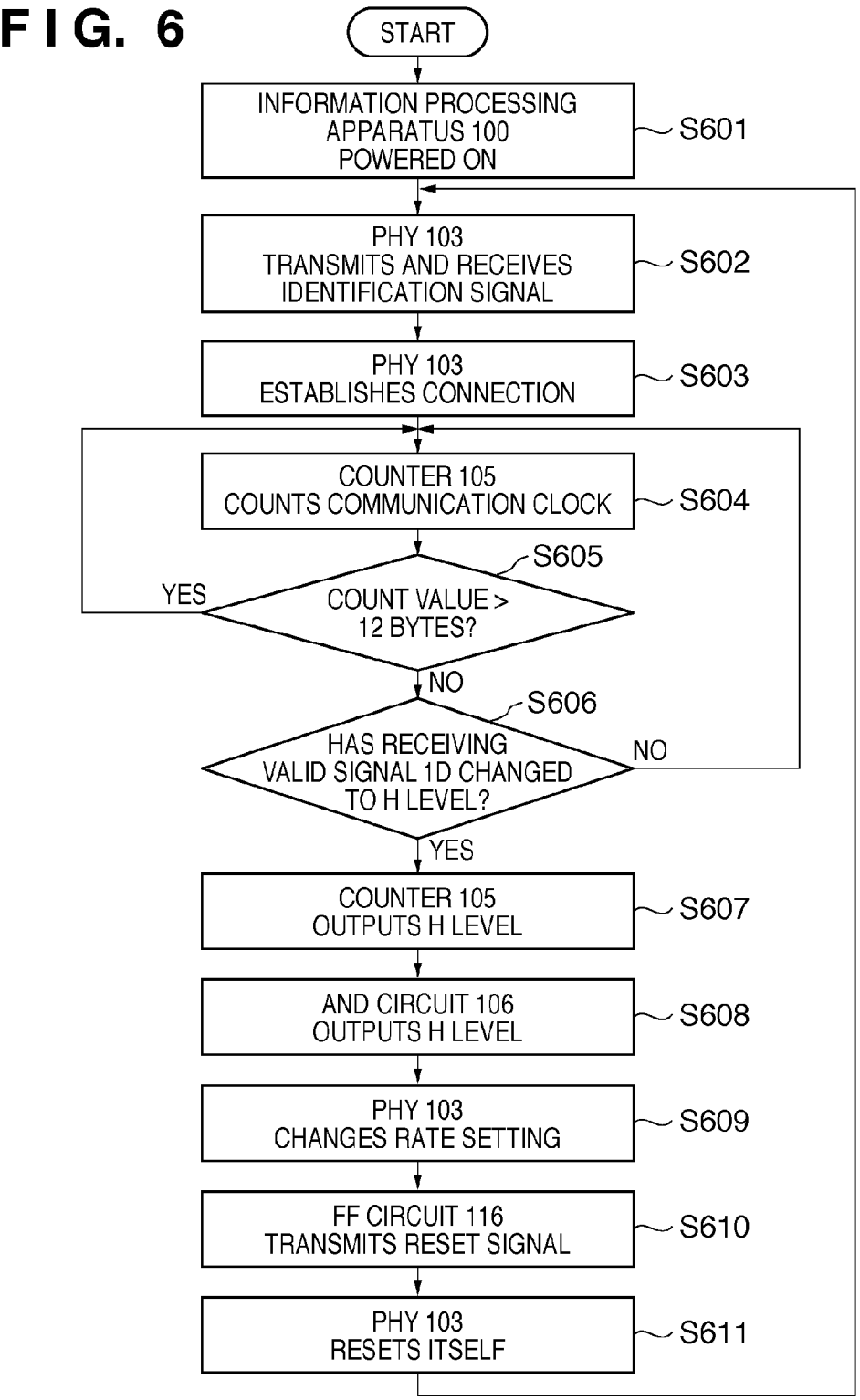

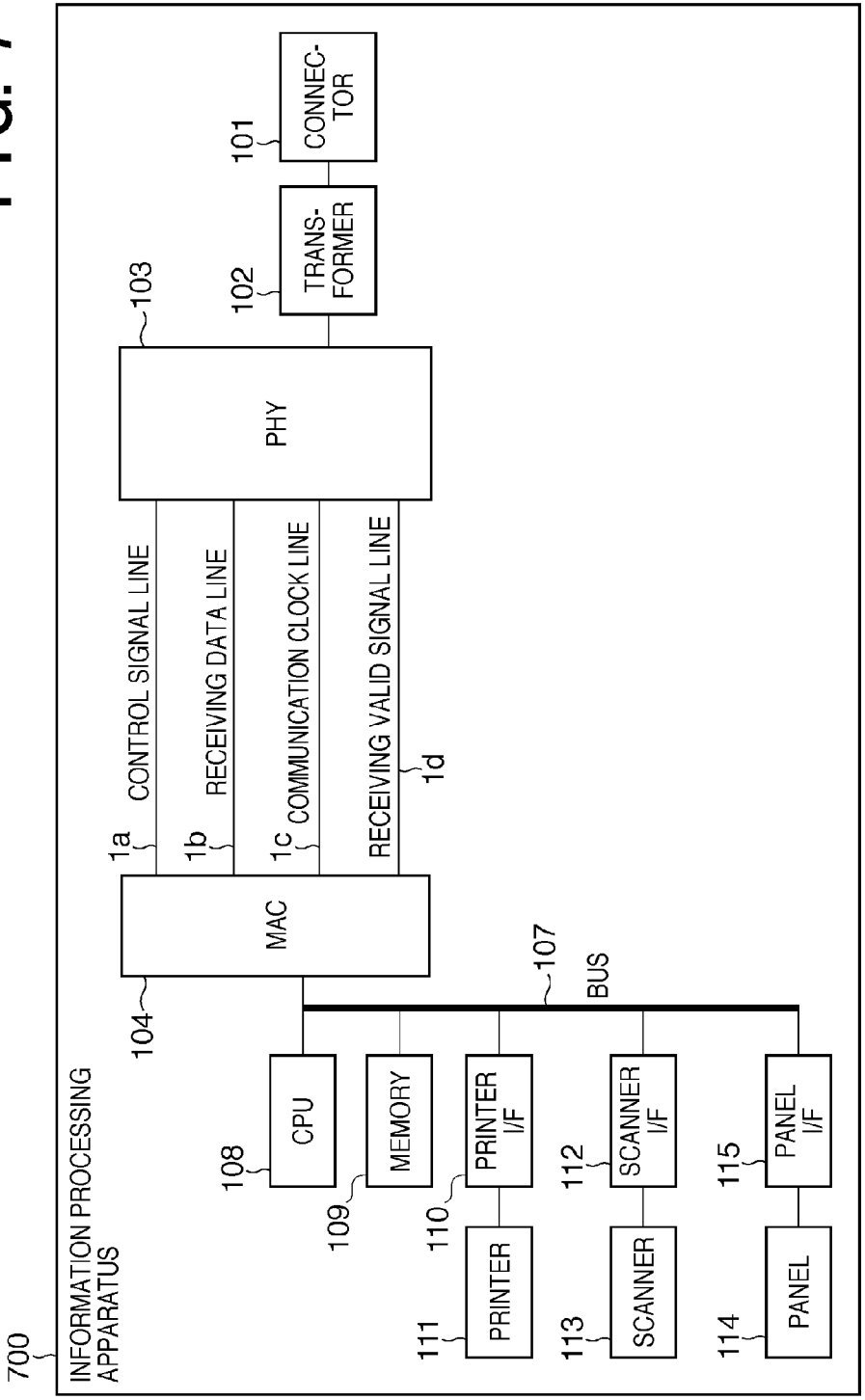

INFORMATION PROCESSING APPARATUS, CONTROL METHOD THEREOF AND PROGRAM

BACKGROUND OF THE INVENTION

1. Field of the Invention

The present invention relates to an information processing apparatus that is connected to external apparatus via a network, a control method thereof and a program.

2. Description of the Related Art

Information processing apparatus that can be connected to a LAN network, such as printers and multifunction peripherals, are required to operate at lower power. Accordingly, a reduction in the power consumption required for communication with external apparatus via a network is increasingly becoming an issue. A control method using magic packets during communications has been presented as a solution to this. This is a method in which a device is usually set to off and the device is powered on upon receipt of a magic packet. With this method, it is possible to control the power supply to a physical layer (PHY) that connects a line between information processing apparatus. Japanese Patent Laid-Open No. 2006-270470 proposes a method for controlling a PHY communication rate according to the total size of received data. This method focuses attention on the property in which the power consumption increases proportionately with the communication rate. Specifically, the power consumption is reduced by using a minimum required communication rate based on the total size of received data.

The conventional technique, however, has the following problems. For example, with the conventional technique, because the PHY rate is set according to the total amount of received data, the PHY rate is increased even when the reception rate is sufficiently lower than the PHY communication rate. Consequently, the PHY needs to exhibit undue performance, resulting in excessive power consumption. In addition, when packets having a size smaller than a receiving data size threshold are input in bursts, which is a condition for increasing the PHY rate, the PHY rate cannot be changed to high speed. Accordingly, when a large amount of data is received, there is a possibility that the packets might not be smoothly transmitted, and congestion might occur within the network. Because the rate is determined according only to the size of data transmitted from, for example, a single external apparatus, problems occur when concurrently communicating with a plurality of external apparatus. In other words, when concurrently communicating with a plurality of external apparatus, the data from the respective apparatus concurrently flow into a signal line, and therefore the rate appropriate to receive data from a single external apparatus is insufficient.

SUMMARY OF THE INVENTION

The present invention enables realization of an information processing apparatus that, during data communication with a plurality of external apparatus, maintains the accuracy of the data communication and reduces the power consumed in the data communication, and a control method thereof.

One aspect of the present invention provides an information processing apparatus being capable of communication with a plurality of external apparatus, the information processing apparatus comprising: a rate setting unit that sets a communication rate of data communication with the external apparatus; a receiving unit that receives data packets from the external apparatus by using the set communication rate; a receiving interval measurement unit that measures a receiving interval between the data packets received by the receiving unit; a determining unit that determines whether or not the measured receiving interval exceeds a predetermined threshold; and a rate control unit that maintains the currently set communication rate in a case where the measured receiving interval exceeds the predetermined threshold, and changes the currently set communication rate to a communication rate faster than the currently set communication rate in a case where the measured receiving interval does not exceed the predetermined threshold.

Another aspect of the present invention provides a method for controlling an information processing apparatus being capable of communication with a plurality of external apparatus, the method comprising: setting a communication rate of data communication with the external apparatus, which is performed by a rate setting unit; receiving data packets from the external apparatus by using the set communication rate, which is performed by a receiving unit; measuring a receiving interval between the data packets received in the receiving step, which is performed by a receiving interval measurement unit; determining whether or not the measured receiving interval exceeds a predetermined threshold, which is performed by a determining unit; and maintaining the currently set communication rate in a case where the measured receiving interval exceeds the predetermined threshold, and changing the currently set communication rate to a communication rate faster than the currently set communication rate in a case where the measured receiving interval does not exceed the predetermined threshold, which is performed by a rate control unit.

Still another aspect of the present invention provides a computer-readable storage medium storing a computer program for causing a computer to execute the method for controlling the information processing apparatus.

Further features of the present invention will be apparent from the following description of exemplary embodiments with reference to the attached drawings.

BRIEF DESCRIPTION OF THE DRAWINGS

FIG. 4 is a timing chart according to Embodiment 1 when an inter-packet gap exceeds 12 bytes.

FIG. 5 is a timing chart according to Embodiment 1 when an inter-packet gap is 12 bytes.

FIG. 6 is a flowchart showing a processing procedure for changing a rate setting according to Embodiment 1.

FIG. 7 is a diagram showing an example of a hardware configuration of an information processing apparatus 700 according to Embodiment 2.

DESCRIPTION OF THE EMBODIMENTS

Figure 1:
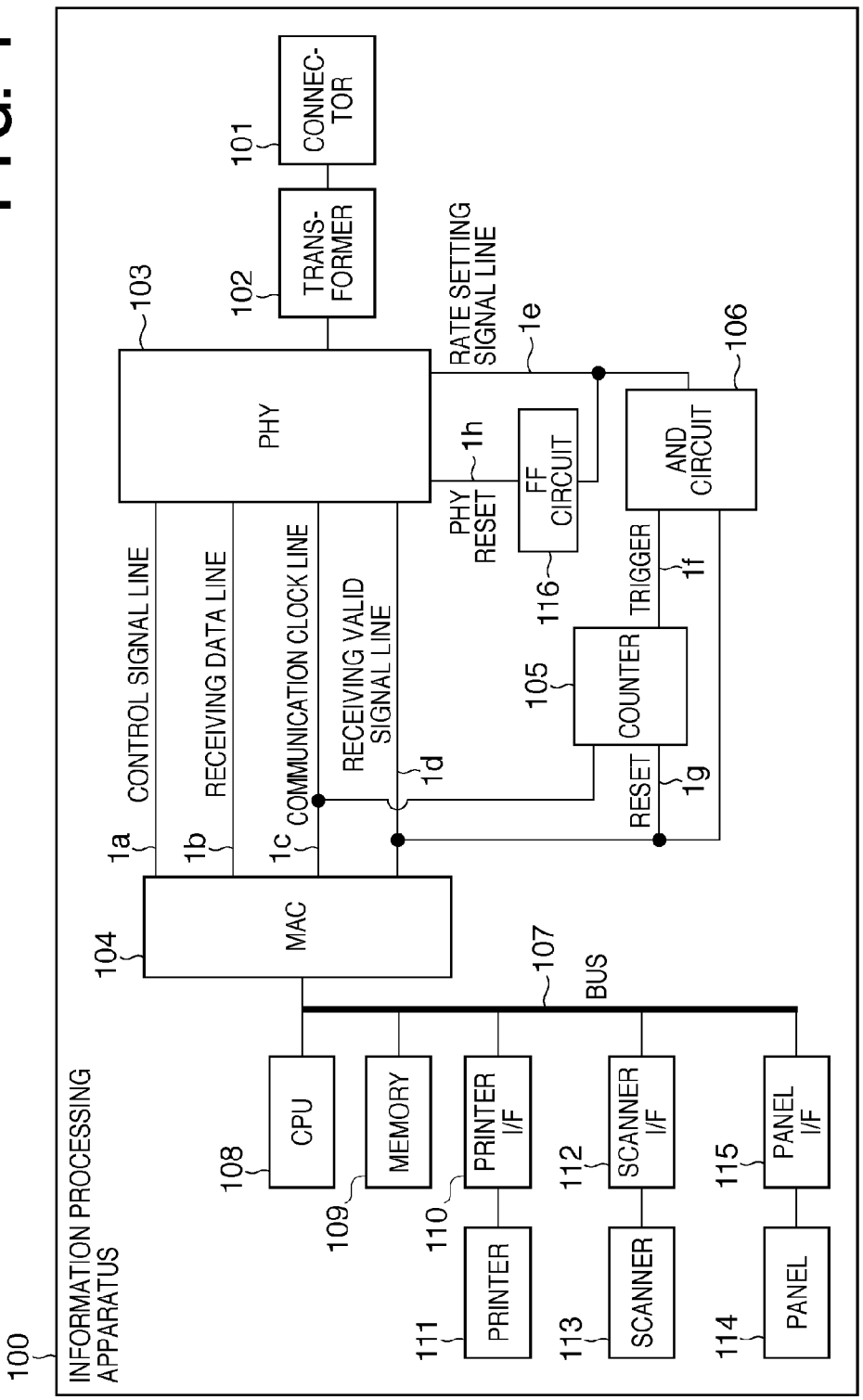
FIG. 1 is a diagram showing an example of a hardware configuration of an information processing apparatus 100 according to Embodiment 1.

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Configuration of Information Processing Apparatus

Hereinafter, Embodiment 1 will be described with reference to FIGS. 1 to 6. First, a hardware configuration of an information processing apparatus 100 according to the present embodiment will be described with reference to FIG. 1. The information processing apparatus 100 of the present invention is a network device that can be connected to networks. The present embodiment will be described in the context of the information processing apparatus 100 being, as an example, an image processing apparatus such as a copy machine or a printer. However, the information processing apparatus of the present invention is not limited to image processing apparatus, and can be any apparatus being capable of communication with an external apparatus via a network.

Reference numeral 101 is a connector to which a LAN cable modular is connected. Reference numeral 102 is a transformer that electrically insulates the information processing apparatus 100 and a network from each other. Reference numeral 103 is a physical layer (PHY) that is an LSI for connecting to an external apparatus with a network. Reference numeral 104 is a MAC that converts the signal received by the PHY 103 to a signal that can be handled by the devices within the apparatus. Reference numeral 108 is a CPU that issues instructions to the devices within the apparatus. Reference numeral 109 is a memory that stores programs executed by the CPU 108 and data. According to the present embodiment, the memory 109 stores a plurality of communication rates that can be set in the PHY 103. Reference numeral 111 is a printer that prints text and images. Reference numeral 113 is a scanner that reads images and the like from an original. Reference numeral 114 is a panel that displays information regarding the information processing apparatus 100.

Reference numeral 110 is a printer I/F that interfaces between the printer 111 and various devices within the apparatus. Reference numeral 112 is a scanner I/F that interfaces between the scanner 113 and various devices within the apparatus. Reference numeral 115 is a panel I/F that interfaces between the panel 114 and various devices within the apparatus. Reference numeral 107 is a bus that physically connects the devices within the apparatus. Reference numeral 105 is a counter that functions as a receiving interval measurement unit, and that receives and counts a communication clock transmitted by the PHY 103.

Reference numeral 106 is an AND circuit that has two receiving units, and that, when the respective reception units receive a logic H level signal, transmits the logic H level signal. Reference numeral 116 is an FF circuit that outputs a logic H level signal for a short time upon receiving a change from logic L level to logic H level from the AND circuit 106.

Reference numeral 1a is a control signal line that transmits settings information and a control signal from the CPU 108 between the MAC 104 and the PHY 103. Reference numeral 1b is a receiving data line that is a signal line for transmitting the packets received by the PHY 103 via a line to the MAC 104. Reference numeral 1c is a communication clock line that is a signal line for passing a reference clock constantly output by the PHY 103 on to the MAC 104. Reference numeral 1d is a receiving valid signal line that is a signal line for transmitting valid signals to the MAC 104 while the PHY 103 is receiving valid packets. Reference numeral 1e is a rate setting signal line that is output from the AND circuit 106 and that transmits a logic H or L signal to a rate setting unit provided in the PHY 103. Reference numeral 1f is a trigger that is a signal line for transmitting the output of the counter 105 to the AND circuit 106. Reference numeral 1g is a signal line reset that is a signal line that transmits a reset signal that resets the information counted by the counter 105. Reference numeral 1h denotes a PHY reset that is a signal line that transmits the signal output from the FF circuit 116 as a reset to the PHY 103.

The data communication between the information processing apparatus 100 and external apparatus, and the flow of data within the information processing apparatus 100 will be described here. The information processing apparatus 100 is connected to a plurality of external apparatus on a network with the connector 101 via LAN cables. The packets received from the external apparatus arrive at the PHY 103 via the transformer 102. The maximum rate of physical communication with the external apparatus is set in the PHY 103. The packets received by the PHY 103 are routed to the MAC 104 and then to the bus 107, and processed in accordance with a program executed by the CPU 108 as appropriate.

The printer I/F 110 and the scanner I/F 112 transmit and receive data to and from the printer 111 and the scanner 113, respectively in accordance with the program executed by the CPU 108. The panel I/F 115 transmits the instructions issued via the panel 114 to the CPU 108 via the bus 107. The panel I/F 115 also displays a program instructed by the CPU 108 on the panel 114. Programs executed by the CPU are recorded in the memory 109. The maximum rate set in the PHY 103 is notified to the CPU 108 with the control signal line 1a of the lines between the PHY 103 and the MAC 104. When there is an instruction from the CPU 108, the maximum rate of the PHY 103 can be set.

The packets received from the network are transmitted to the MAC 104 via the receiving data line 1b. The PHY 103 constantly transmits a clock generated based on the rate of the PHY 103 to the MAC 104 through the communication clock line 1c. While receiving valid packets, the PHY 103 transmits valid signals to the MAC 104 by using the receiving valid signal line 1d.

The counter 105 counts the communication clock input through the communication clock line 1c. It is assumed here that the counter 105 transmits an H level signal via the trigger 1f when the counter value is less than a predetermined value, and the counter 105 transmits an L level signal via the trigger 1f when the counter value reaches the predetermined value.

The receiving valid signal line 1d also functions as the reset 1g to reset the counter 105. Specifically, the receiving valid signal line 1d resets the counter 105 when the signal transmitted from the receiving valid signal line 1d is H level, and cancels the reset when the signal is L level. The receiving valid signal line 1d is input to the AND circuit 106 as with the trigger 1f.

The AND circuit 106 outputs a signal to change the rate of the PHY 103 to the PHY 103 via the rate setting signal line 1e when an H level signal is input from the trigger 1f and the receiving valid signal line 1d. The FF circuit 116, upon receiving a signal to change from logic L level to logic H level via the rate setting signal line 1e, outputs a logic H level signal for a short time and resets the PHY 103 via the PHY reset 1h. The PHY 103, upon receiving the PHY reset signal after receiving the rate setting signal, starts operating at a newly set rate.

Configuration of Information Processing System

Next, a connection configuration of an information processing system 10 of the present embodiment will be described with reference to FIG. 2. Reference numeral 201 is a hub that connects to a plurality of LAN lines, and that exchanges and broadcasts packets. Reference numeral 205 is a PHY that is used by the hub 201 to connect to external apparatus, and that has the same function as the PHY 103. Reference numerals 202, 203 and 204 are a terminal A, a terminal B and a terminal C that request the information processing apparatus 100 to perform printing, scanning and the like.

In the information processing system 10 of the present embodiment, the information processing apparatus 100 is connected to the hub 201 via the connector 101. The terminal A 202, the terminal B 203 and the terminal C 204 are also connected to the hub 201. Accordingly, the information processing apparatus 100 and the terminals A 202, B 203 and C 204 are communicatively connected via the hub 201.

Inter-Packet Gap

Figure 3:
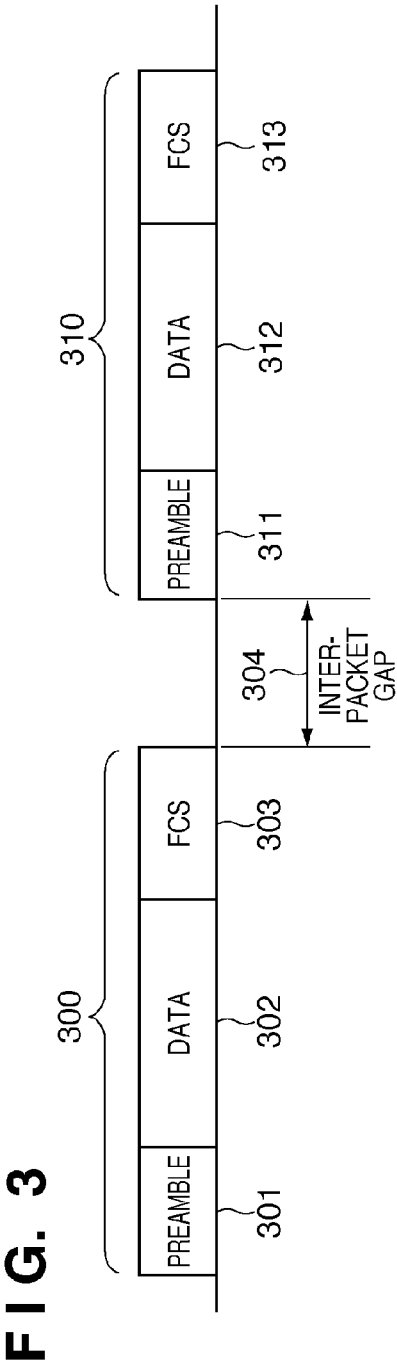
FIG. 3 is a diagram illustrating a gap between Ethernet® packets.

Next, a gap between Ethernet® packets will be described with reference to FIG. 3. FIG. 3 shows an example in which a packet 300 and a packet 310 sequentially flow on a LAN line. The Ethernet® packet 300 includes a preamble 301, data 302 and an FCS 303. Likewise, the packet 310 also includes a preamble 311, data 312 and an FCS 313. The interval between the packet 300 and the packet 310 is an inter-packet gap 304.

The degree of congestion of the LAN line depends on the inter-packet gap 304. By way of example, a case will be described in which the information processing apparatus 100 receives the packet 300 and the packet 310. In this case, if congestion is compared between when the inter-packet gap 304 is 100 bytes and when the inter-packet gap 304 is 200 bytes, the latter case requires twice the time for the packet 310 to arrive compared to the former case. In other words, the LAN line in the former case is twice as congested.

An inter-packet gap between packets flowing on a LAN line is specified to be a minimum of 12 bytes by the Ethernet® standards. In other words, when packet transmission/reception is performed at the maximum physical communication rate of the PHY 103 by a LAN line, the inter-packet gap 304 is set to 12 bytes. On the other hand, in the case of a line with an inter-packet gap 304 of more than 12 bytes, packets flow at a rate lower than the maximum communication rate set in the PHY 103 at that time.

Figure 2:
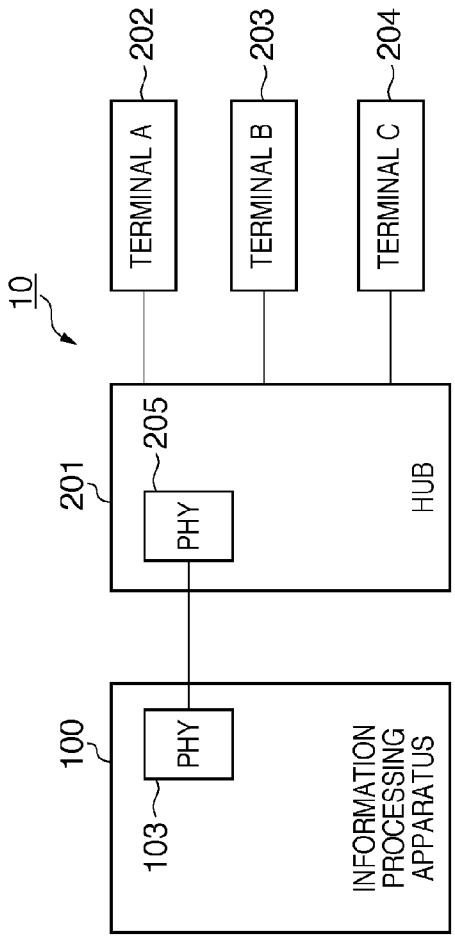
FIG. 2 is a diagram showing an example of a configuration of an information processing system 10 according to Embodiment 1.

Here, a configuration as shown in FIG. 2 is considered in which a plurality of terminals are connected via the hub 201. It is assumed here that the inter-packet gap 304 between packets received by the information processing apparatus 100 is 12 bytes. It is also assumed that the terminal A 202, the terminal B 203 and the terminal C 204 simultaneously access the information processing apparatus 100, and that the respective apparatus link at the maximum rate of 10 Mbps.

If the terminal A 202, the terminal B 203 and the terminal C 204 each transmit data at 5 Mbps, the information processing apparatus 100 will be accessed at 15 Mbps. However, because the information processing apparatus 100 and the hub 201 are linked at 10 Mbps, a 5 Mbps remainder is not received and thus discarded. In other words, when the inter-packet gap 304 is 12 bytes, a situation may arise in which packets are received at a communication rate higher than the communication rate of the PHY 103.

In view of this, according to the present embodiment, the inter-packet gap 304 is detected, and the communication rate setting of the PHY 103 is changed to a high speed. Generally, a plurality of communication rates can be set in a PHY.

Accordingly, in the present embodiment, the communication rate of the PHY is adjusted according to the length of the inter-packet gap 304. With this configuration, the rate can be adjusted so as to be optimal according to the degree of congestion of the line. Specifically, if the detected inter-packet gap 304 is larger than 12 bytes, it indicates that the line is not congested, and therefore the rate of the PHY is maintained without being increased. If, on the other hand, the inter-packet gap 304 is 12 bytes, there is a possibility that packets might be transmitted at a rate exceeding the bandwidth as described above, and therefore the rate is increased.

By performing such control, the rate of the PHY can be set according to the degree of congestion of the line, and the power consumption of the PHY can be reduced. In the present embodiment, this can be implemented by setting the H level transmission threshold of the trigger 1$f$ of the counter 105 to 12 bytes. Generally, a plurality of communication rates such as 10 BASE and 100 BASE can be set in a PHY. Accordingly, in the present embodiment, when the apparatus is powered on, the lowest communication rate of the communication rates that can be set in the PHY is set. It is also possible to set to the lowest communication rate needed to establish communication with external apparatus based on the information exchanged with the external apparatus, which will be described later.

Timing Chart

Hereinafter, timing charts for different inter-packet gaps 304 will be described with reference to FIGS. 4 and 5. A timing chart in the case of an inter-packet gap exceeding 12 bytes will be described first with reference to FIG. 4. First, the H level transmission threshold of the counter 105 is set to 12 bytes. This causes a communication clock 4$a$ to be constantly transmitted from the PHY 103 to the MAC 104 via the communication clock line 1$c$. During reception of a valid signal, a receiving valid signal 4$b$ is transmitted at H level via the receiving valid signal line 1$d$. On the other hand, when the valid signal is not received, the receiving valid signal 4$b$ is transmitted at L level. In other words, this interval is an inter-packet gap 4$d$ shown in FIG. 4. A flag 4$c$ shown in FIG. 4 indicates a value output from the counter 105 via the trigger 1$f$.

As shown in FIG. 4, the counter 105 counts the communication clock 4$a$ while the receiving valid signal 4$b$ is L level. When the receiving valid signal 4$b$ changes from H level to L level, the flag 4$c$ is set to H level. After that, when the count value for the communication clock 4$a$ is more than 12 bytes, the count value of the counter 105 is reset, and the flag 4$c$ is set to L level. At this time, the AND circuit 106 outputs an L level signal regardless of the output level of the receiving valid signal 4$b$ because the flag 4$c$ is set to L level. In other words, because the signal of the rate setting signal line 1$e$ is output to the PHY 103 at L level, the rate of the PHY 103 is not changed.

Next, a timing chart in the case of an inter-packet gap 304 being 12 bytes will be described with reference to FIG. 5. First, the H level transmission threshold of the counter 105 is set to 12 bytes. This causes a communication clock 5$a$ to be constantly transmitted from the PHY 103 to the MAC 104 via the communication clock line 1$c$. During reception of a valid signal, a receiving valid signal 5$b$ is transmitted at H level via the receiving valid signal line 1$d$. On the other hand, when a valid signal is not received, the receiving valid signal 5$b$ is transmitted at L level. In other words, this interval is an inter-packet gap 5$d$ shown in FIG. 5. A flag 5$c$ shown in FIG. 5 indicates a value output from the counter 105 via the trigger 1$f$.

As shown in FIG. 5, the counter 105 counts the communication clock 5a while the receiving valid signal 5b is L level. When the receiving valid signal 5b changes from H level to L level, the flag 5c is set to H level. After that, if the count value for the communication clock 5a is 12 bytes or less, the flag 5c is set to H level. In other words, if the count value for the communication clock 5a does not equal or exceed 13 bytes, the flag 5c is maintained at H level and input to the AND circuit 106. The receiving valid signal 5b at this time returns to H level again upon receiving the valid signal, and is input to the AND circuit 106. Accordingly, the AND circuit 106 outputs an H level signal to the rate setting signal line 1e, or in other words, a signal to change the rate setting is transmitted to the PHY 103.

Data Communication Rate Change Control

Next, a processing procedure for data communication rate change control performed by the PHY 103, the counter 105, the AND circuit 106 and the FF circuit 116 according to the present embodiment will be described with reference to FIG. 6. In the following, the numbers after the letter "S" indicate step numbers.

First, in S601, the information processing apparatus 100 is powered on. Subsequently, in S602, the PHY 103 transmits and receives identification signals to and from the PHY 205 that is connected via the network, identifies a connectable rate and sets the rate. After that, in S603, the PHY 103 establishes a link with external apparatus to be connected.

Next, in S604, the counter 105 starts counting a communication clock in a receiving interval between packet data. As used herein, the communication clock refers to a clock used by the information processing apparatus 100 to transmit and receive packet data to and from external apparatus. After start of communication clock counting, the counter 105 changes an output to the trigger 1f from L level to H level as shown in FIGS. 4 and 5 when the output via the receiving valid signal line 1d changes from H level to L level. After that, in S605, the counter 105 determines whether or not the count value of the counter 105 exceeds 12 bytes. If the count value exceeds 12 bytes, control returns to S604 without changing the communication rate of the PHY 103.

If, on the other hand, the count value is 12 bytes or less, control advances to S606, where the counter 105 determines whether or not the output via the receiving valid signal line 1d has changed from L level to H level. If the output via the receiving valid signal line 1d remains at L level, control returns again to S604, where the counter 105 continues communication clock counting. If, on the other hand, the output via the receiving valid signal line 1d has changed from L level to H level, control advances to S607, where the counter 105 maintains the value that is output to the trigger 1f at H level. Here, in S608, because the AND circuit 106 has received two H level signals, the output level is changed to H. Accordingly, in S609, the PHY 103 changes the rate setting. Specifically, the PHY 103 changes the communication rate to a communication rate faster than the currently set communication rate from among a plurality of communication rates stored in advance in the memory 109. With this rate control, it is desirable to change the communication rate to a communication rate that is one level faster than the currently set communication rate, whereby the power consumed in the data communication can be reduced as low as possible.

After that, in S610, the FF circuit 116 transmits a reset signal to the PHY 103. Upon receiving the reset signal, the PHY 103 resets itself in S611. After that, control returns to S602, where the PHY 103 transmits/receives an identification signal including the newly set rate information to/from the external apparatus to be re-connected. After that, the PHY 103 starts communication with the devices to be connected at the new rate.

As described above, the information processing apparatus of the present embodiment sets the communication rate of data communication with a plurality of external apparatus that are connected communicatively, and measures each receiving interval between data packets received in the data communication with the external apparatus. Furthermore, the information processing apparatus determines whether or not the measured receiving interval exceeds a predetermined threshold. If the measured receiving interval exceeds the predetermined threshold, the currently set communication rate is maintained. If not, the currently set communication rate is changed to a communication rate faster than the currently set communication rate. In this manner, according to the present embodiment, the communication rate is controlled based on the receiving interval of received data packets, rather than based on the size of data transmitted in data communication with a particular external apparatus. In other words, the information processing apparatus of the present embodiment determines the communication rate based on the amount of communication in data communication with a plurality of external apparatus, and changes the communication rate to a high speed only when it is determined that the reception rate is the maximum communication rate of the PHY or more. Accordingly, the information processing apparatus of the present embodiment can maintain the accuracy of data communication, as well as reducing the power consumed in the data communication.

Embodiment 2

Figure 8:
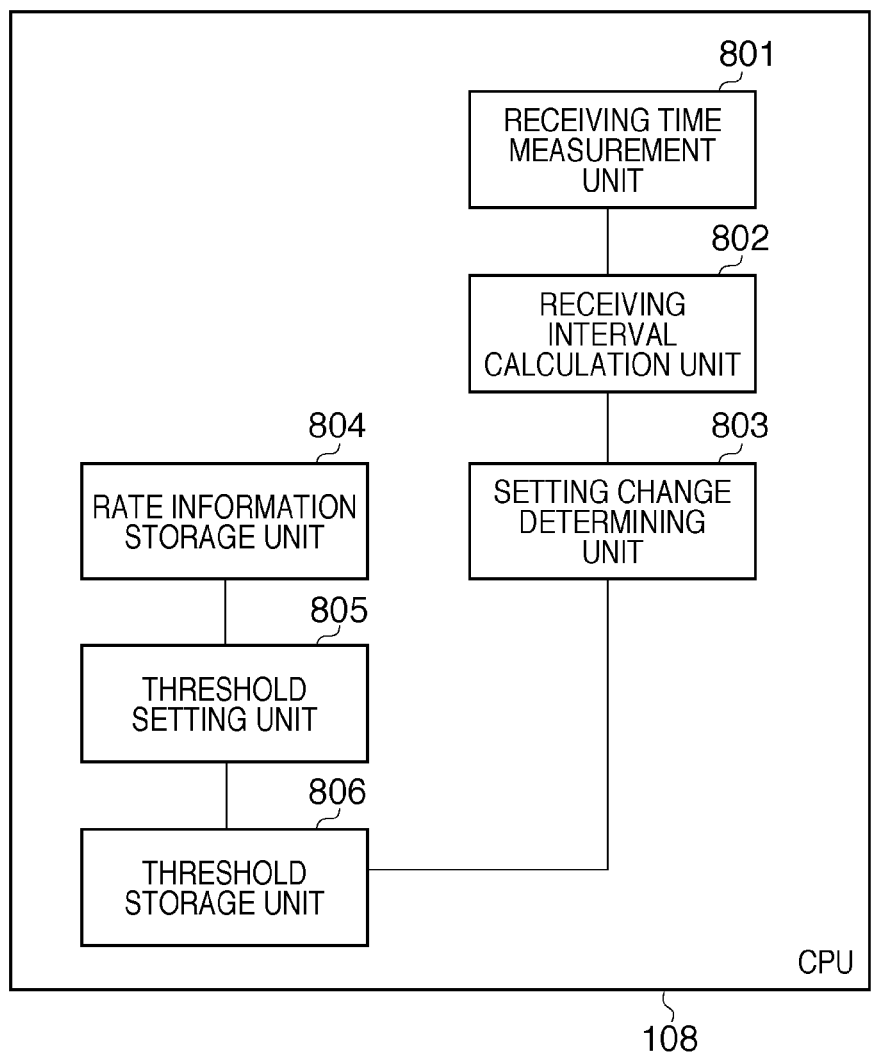
FIG. 8 is a block diagram showing an example of a functional configuration of a CPU 108 according to Embodiment 2.
Figure 9:
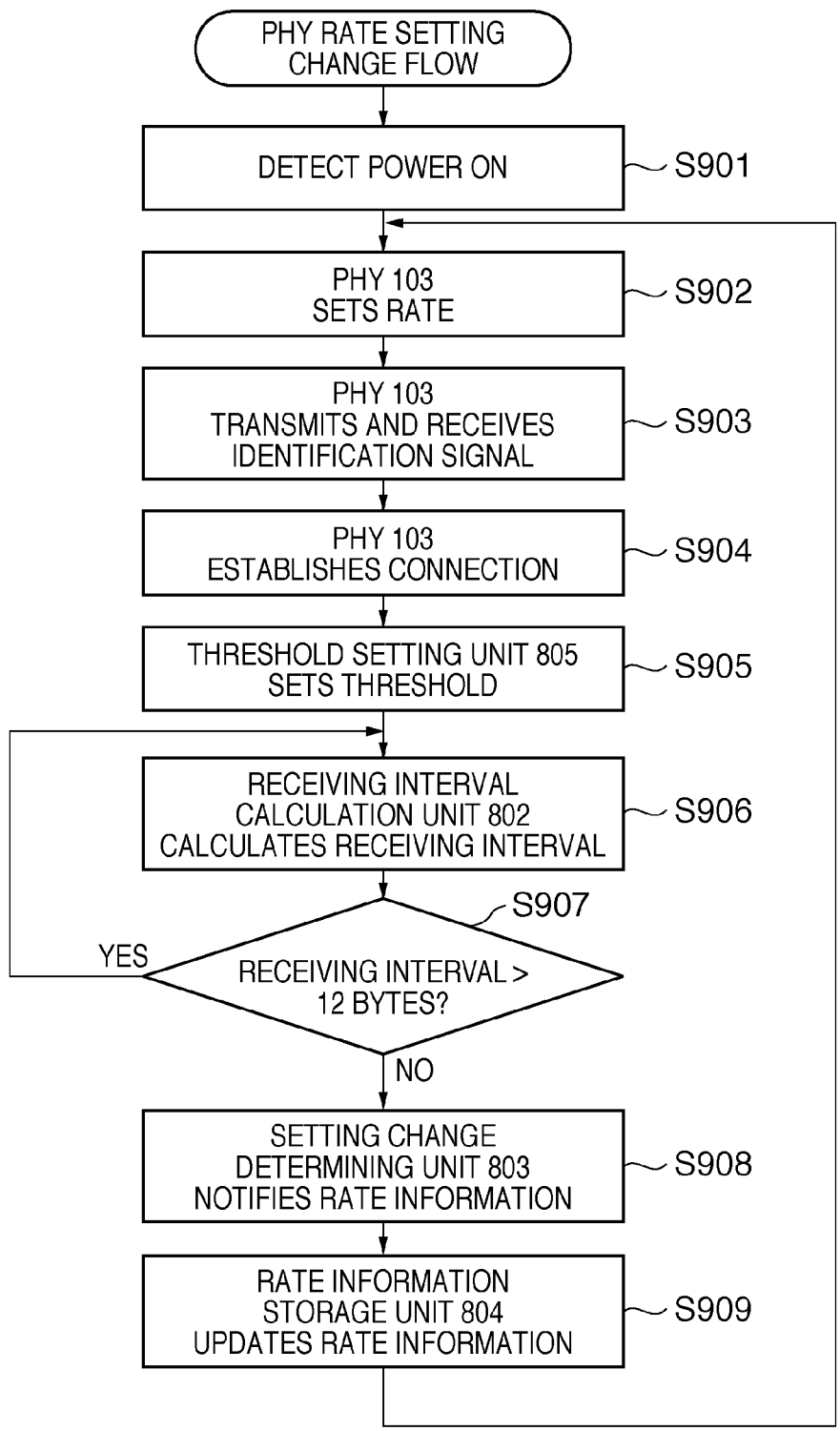
FIG. 9 is a flowchart showing a processing procedure for changing a rate setting executed by the CPU 108 according to Embodiment 2.

Embodiment 2 will be described next with reference to FIGS. 7 to 9. Hereinafter, only configurations and techniques that are different from those of Embodiment 1 will be described. The time to transfer 12 bytes, which is the minimum Ethernet® inter-packet gap, depends on the communication rate set in the PHY. For example, when the communication rate of the PHY is set to 10 BASE, the time required to transfer 12 bytes is 9.6 microseconds. When the communication rate of the PHY is set to 100 BASE, which is ten times that of 10 BASE, the transfer time is 0.96 microseconds, which is one tenth of that of 10 BASE. In other words, the inter-packet gap can also be measured by measuring the arrival time of each packet and measuring the difference in arrival time as appropriate. In the present embodiment, the use of this method enables control of the rate of the PHY with software, and the same effects as those of Embodiment 1 can be obtained.

First, a hardware configuration of an information processing apparatus 700 according to the present embodiment will be described with reference to FIG. 7. The information processing apparatus 700 can be implemented by removing some components from the configuration of the information processing apparatus 100. Specifically, as shown in FIG. 7, the information processing apparatus 700 has a configuration obtained by removing the counter 105, the AND circuit 106, the FF circuit 116 and the signal lines connected to these components from the information processing apparatus 100. Other components are the same as those shown in FIG. 1, and thus a description thereof is omitted here.

A configuration of functions executed by the CPU 108 according to the present embodiment will be described next with reference to FIG. 8. The CPU 108 has functional blocks described below that are executed by the CPU 108 reading a program stored in the memory 109 in advance. Specifically, the CPU 108 has the following functional blocks: a receiving time measurement unit 801, a receiving interval calculation unit 802, a setting change determining unit 803, a rate information storage unit 804, a threshold setting unit 805, and a threshold storage unit 806.

The receiving time measurement unit 801 records the time at which each packet is received. The receiving time measurement unit 801 also transmits the recorded information to the receiving interval calculation unit 802. The receiving interval calculation unit 802 transmits the receiving interval measured based on the information received from the receiving time measurement unit 801 to the setting change determining unit 803. Information regarding the communication rate set in the PHY 103 has been stored in the rate information storage unit 804, and the rate information storage unit 804 transmits the rate information to the threshold storage unit 806. The threshold setting unit 805 sets a threshold for increasing the rate setting of the PHY 103 based on the rate information obtained from the rate information storage unit 804, and stores the information in the threshold storage unit 806. The setting change determining unit 803 compares the obtained inter-packet gap (receiving interval) with the threshold, and updates the rate information stored in the rate information storage unit 804 based on the result of the determination. As a result of the comparison, if the obtained inter-packet gap is larger than the setting change threshold, it is unnecessary to change the setting. If, on the other hand, the obtained inter-packet gap matches the setting change threshold, the setting is changed to a communication rate that is one level faster.

Next, a processing procedure for changing the rate setting executed by the CPU 108 of the present embodiment will be described with reference to FIG. 9. First, in S901, the information processing apparatus 700 is powered on. Subsequently, in S902, the CPU 108 sets the programmed default rate as the rate of the PHY 103. After that, in S903, the PHY 103 transmits and receives identification signals to and from the PHY 205 connected via the network, identifies a connectable rate and sets the rate. After that, in S904, the PHY 103 establishes a link with the connected external apparatus.

Next, in S905, the threshold setting unit 805 determines a rate setting change threshold based on the rate stored in the rate information storage unit 804, and notifies the threshold storage unit 806 of the determined threshold. In S906, the receiving interval calculation unit 802 calculates a packet receiving interval from the difference between receiving times of data packets obtained from the receiving time measurement unit 801. In S907, the setting change determining unit 803 determines whether to perform a setting change based on the receiving interval obtained by the receiving interval calculation unit 802 and the rate change threshold. Specifically, the setting change determining unit 803 determines whether or not the receiving interval exceeds 12 bytes. If the receiving interval exceeds 12 bytes, control returns to S906 without changing the rate.

If, on the other hand, the receiving interval is 12 bytes or less, control advances to S908, where the setting change determining unit 803 notifies the rate information storage unit 804 of rate information that is updated. In S909, the rate information storage unit 804 updates the rate information, and notifies the threshold setting unit 805 of a new rate. Then, control returns to S902, where the CPU 108 sets the updated rate as the rate of the PHY 103.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via the network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-184832 filed on Aug. 7, 2009, which is hereby incorporated by reference herein in its entirety.

What is claimed is:

1. An information processing apparatus being capable of communication with an external apparatus via a network, the information processing apparatus comprising:
    a rate setting unit that sets a communication rate of data communication with the external apparatus;
    a receiving unit that receives packets from the external apparatus via the network by using the set communication rate;
    a measurement unit that measures an inter-packet gap indicating a time period until the receiving unit starts, after completing a reception of a first packet, a reception of a second packet to be received following the first packet;
    a determining unit that determines whether or not the measured inter-packet gap exceeds a predetermined threshold; and
    a rate control unit that maintains the currently set communication rate in a case where the measured inter-packet gap exceeds the predetermined threshold, and changes the currently set communication rate to a communication rate faster than the currently set communication rate in a case where the measured inter-packet gap does not exceed the predetermined threshold,
    wherein a counter is included in the apparatus, the counter being configured to (a) count a count value of a communication clock while a receiving valid signal is a low level and not a high level, (b) output a high level signal in response to the count value being not more than the predetermined threshold, and (c) output a low level signal in response to the count value being more than the predetermined threshold, and
    wherein the rate control unit operates in accordance with the signal output by the counter.

2. The information processing apparatus according to claim 1, further comprising a storage unit that stores a plurality of communication rates,
    wherein the rate setting unit sets a lowest communication rate from among the plurality of communication rates stored in the storage unit when the information processing apparatus is powered on.

3. The information processing apparatus according to claim 1, wherein the predetermined threshold is a value indicating a minimum interval when the receiving unit receives the packets.

4. The information processing apparatus according to claim 1, wherein the inter-packet gap indicates an interval between a frame check sequence (FCS) of the first packet and a preamble of the second packet.

5. The information processing apparatus according to claim 1, further comprising a storage unit that stores a plurality of communication rates,
wherein the rate control unit changes, in a case where the measured inter-packet gap does not exceed the predetermined threshold, the currently set communication rate to a communication rate that is one level faster than the currently set communication rate based on information stored by the storage unit.

6. A method for controlling an information processing apparatus being capable of communication with an external apparatus via a network, the method comprising:
setting a communication rate of data communication with the external apparatus, which is performed by a rate setting unit;
receiving packets from the external apparatus via the network by using the set communication rate, which is performed by a receiving unit;
measuring an inter-packet gap indicating a time period until the receiving step starts, after completing a reception of a first packet, a reception of a second packet to be received following the first packet, which is performed by a measurement unit;
determining whether or not the measured inter-packet gap exceeds a predetermined threshold, which is performed by a determining unit;
maintaining the currently set communication rate in a case where the measured inter-packet gap exceeds the predetermined threshold, and changing the currently set communication rate to a communication rate faster than the currently set communication rate in a case where the measured inter-packet gap does not exceed the predetermined threshold, which is performed by a rate control unit;
counting, by a counter, a count value of a communication clock while a receiving valid signal is a low level and not a high level;
outputting, by the counter, a high level signal in response to the count value being not more than the predetermined threshold; and
outputting, by the counter, a low level signal in response to the count value being more than the predetermined threshold,
wherein the maintaining and changing step is performed in accordance with the signal output by the counter.

7. A non-transitory computer-readable storage medium storing a computer program for causing a computer to execute the method for controlling an information processing apparatus according to claim 6.

* * * * *